(12) United States Patent
Meredith et al.

(10) Patent No.: US 11,056,752 B2
(45) Date of Patent: Jul. 6, 2021

(54) COPPER COLLECTOR PLATE FOR HIGH POWER BATTERY MODULES

(71) Applicant: Lithos Energy, Inc., Sausalito, CA (US)

(72) Inventors: James Meredith, Corte Madera, CA (US); Erik Stafl, San Francisco, CA (US); Katelyn Ferguson, El Sobrante, CA (US)

(73) Assignee: LITHOS ENERGY, INC., San Rafael, CA (US)

( * ) Notice: Subject to any disclaimer, the term of this patent is extended or adjusted under 35 U.S.C. 154(b) by 55 days.

(21) Appl. No.: 16/177,746

(22) Filed: Nov. 1, 2018

(65) Prior Publication Data

US 2019/0131608 A1  May 2, 2019

Related U.S. Application Data

(60) Provisional application No. 62/580,298, filed on Nov. 1, 2017.

(51) Int. Cl.
| | |
|---|---|
| *H01M 50/502* | (2021.01) |
| *H01M 50/20* | (2021.01) |
| *H01M 50/528* | (2021.01) |

(52) U.S. Cl.
CPC ......... *H01M 50/502* (2021.01); *H01M 50/20* (2021.01); *H01M 50/528* (2021.01); *H01M 2220/20* (2013.01)

(58) Field of Classification Search
None
See application file for complete search history.

(56) References Cited

U.S. PATENT DOCUMENTS

| | | |
|---|---|---|
| 2010/0255355 A1 | 7/2010 | Park et al. |
| 2015/0364744 A1 | 12/2015 | Takano |
| 2016/0073506 A1* | 3/2016 | Coakley ............... H05K 1/189 |
| | | 156/60 |
| 2016/0133908 A1 | 5/2016 | Zhao |
| 2016/0322623 A1 | 11/2016 | Kim |
| 2016/0336575 A1* | 11/2016 | Liu .................... H01R 13/245 |
| 2016/0380319 A1 | 12/2016 | Rhein |
| 2017/0005371 A1 | 1/2017 | Chidester |
| 2017/0005378 A1 | 1/2017 | Rong |
| 2017/0062880 A1 | 3/2017 | Riemer |

* cited by examiner

*Primary Examiner* — Carmen V Lyles-Irving
(74) *Attorney, Agent, or Firm* — Brad Bertoglio; Intelink Law Group, P.C.

(57) ABSTRACT

A battery module is formed from a plurality of battery cells having top and bottom electrodes. Top and bottom collector plates overlay, and are electrically connected with, the battery cell top and bottom electrodes. The collector plates may be formed wholly or primarily from copper. Cell apertures may be formed within the collector plates overlying each cell, with collector arms extending into said apertures for connection with an underlying cell electrode. The collector arms may include a fusible link for each cell. A bridge collector plate may span subsets of cells, and include a module-level fusible link formed therein. A current concentrator, such as a dimple or depression, may be formed in a collector arm to facilitate resistance welding of the copper collector plates to underlying battery cells, which may include electrodes formed from steel or other material more resistive than the copper collector plates.

2 Claims, 10 Drawing Sheets

COPPER COLLECTOR PLATE FOR HIGH POWER BATTERY MODULES

TECHNICAL FIELD

The present disclosure relates in general to large format battery packs, and in particular to battery modules utilizing collector plates for high-power applications.

BACKGROUND

As battery cell technology and manufacturing capacity improves, electric battery cells are increasingly used in high power applications. For example, high-power yet cost-effective battery packs are critical to the commercial viability of electric cars and other motive applications that may have traditionally been powered by non-electric means.

One popular approach via which battery packs may generate high power output levels is to combine very large quantities of small battery cells into a large format battery pack. Dozens or hundreds of cells may be combined to deliver significantly higher levels of voltage and current output. The small-format cells may be produced in very high volume and very cost-effectively, with the failure or capacity degradation of any individual cell having very limited impact on the performance of the pack as a whole. For these and other reasons, such large cell count battery packs have become a predominant approach for high-power applications such as electric cars.

However, this battery pack construction presents several challenges. The battery collector structure may be exposed to very high amounts of current generated by the aggregate output of potentially hundreds of individual battery cells. The battery collector structure design may be subject to stringent cost and manufacturability constraints. In use, the collector structure should preferably be lightweight, yet mechanically and electrically reliable, even while exposed in some applications to significant physical vibration, impact and ambient temperature variation. These constraints and others may present significant challenges to design and implementation of a battery pack.

SUMMARY

The present disclosure describes various constructions for battery modules and components thereof, as well as methods for manufacturing and using such modules.

In accordance with one aspect, a battery module may be formed from a plurality of battery cells installed within a retaining frame. The cells may be standard cylindrical cells with electrodes at each end, oriented with their longitudinal axes parallel to one another and ends aligned. The battery module may include a plurality of collector plates, preferably formed primarily from copper, such as tin-plated copper. The collector plates may include apertures overlying each cell, with a collector arm extending into each aperture for interconnection with an underlying cell electrode.

The collector arms may each include a current concentrator, such as a dimple or depression extending from a plane in which the bulk of the collector plate lies. In some embodiments, the current concentrators may be formed in the collector plates at the time of plate manufacture. In other embodiments, the current concentrators may be formed in the collector plates at the time of module manufacture, such as via deformation by a resistance welding electrode. The current concentrators may act to localize resistance welding current when welding the collector plate to underlying cells. For example, in accordance with one exemplary method, a first welding electrode may be applied to a collector plate collector arm proximate a current concentrator; a second welding electrode may be applied directly to the electrode of a cell underlying said current concentrator; whereby application of resistance welding current causes fusing of the collector arm with the cell electrode proximate the current concentrator location.

At least some of the collector arms (preferably, one per cell) may include fusible links. The fusible links may be formed from the collector plate as a narrowing of a collector arm, providing a locally minimized current carrying capacity. In some embodiments, the fusible link may be formed as an extended collector arm wrapping around at least a portion of a perimeter of a cell aperture. One or more collector plates may also act as a bridge collector plate and include a cell group fusible link, formed therein at a location with locally minimized current carrying capacity spanning two groups of cells.

In accordance with other aspects and embodiments, parts of said battery modules (such as copper collector plates described above) may be provided, as well as methods for manufacturing battery modules involving resistance welding of copper collector plates to a plurality of battery cells.

Various other objects, features, aspects, and advantages of the present invention and embodiments will become more apparent from the following detailed description of preferred embodiments, along with the accompanying drawings in which like numerals represent like components.

DETAILED DESCRIPTION

Figure 1:
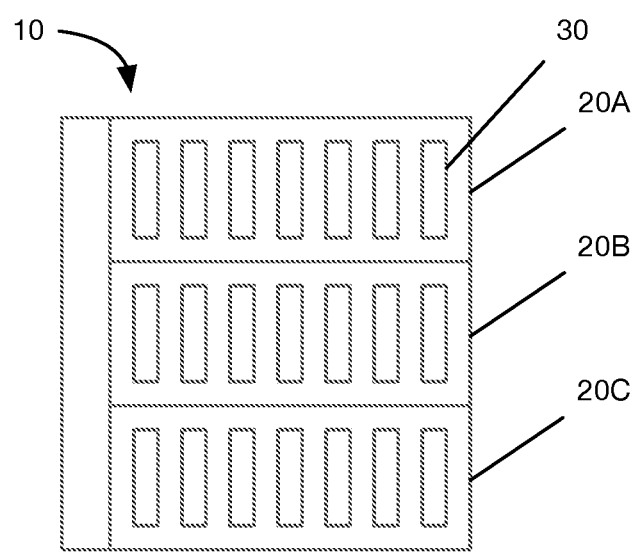
FIG. 1 is a schematic block diagram of a battery pack.

While this invention is susceptible to embodiment in many different forms, there are shown in the drawings and will be described in detail herein several specific embodiments, with the understanding that the present disclosure is to be considered as an exemplification of the principles of the invention to enable any person skilled in the art to make and use the invention, and is not intended to limit the invention to the embodiments illustrated.

In some circumstances, it may be desirable to form a battery pack by combining one or more discrete battery modules. FIG. 1 provides a schematic block diagram of such a battery pack. Battery pack 10 is formed from three battery modules 20, namely, modules 20A, 20B and 20C. Each module 20 includes a large quantity of battery cells 30. Combining multiple modules into a battery pack can provided high levels of configurability, reusing common parts to meet a wide variety of pack specifications. Combining multiple modules may also provide for form factor flexibility. As described further herein, module-based battery pack constructions may also provide higher levels of safety and fault tolerance.

Figure 2:
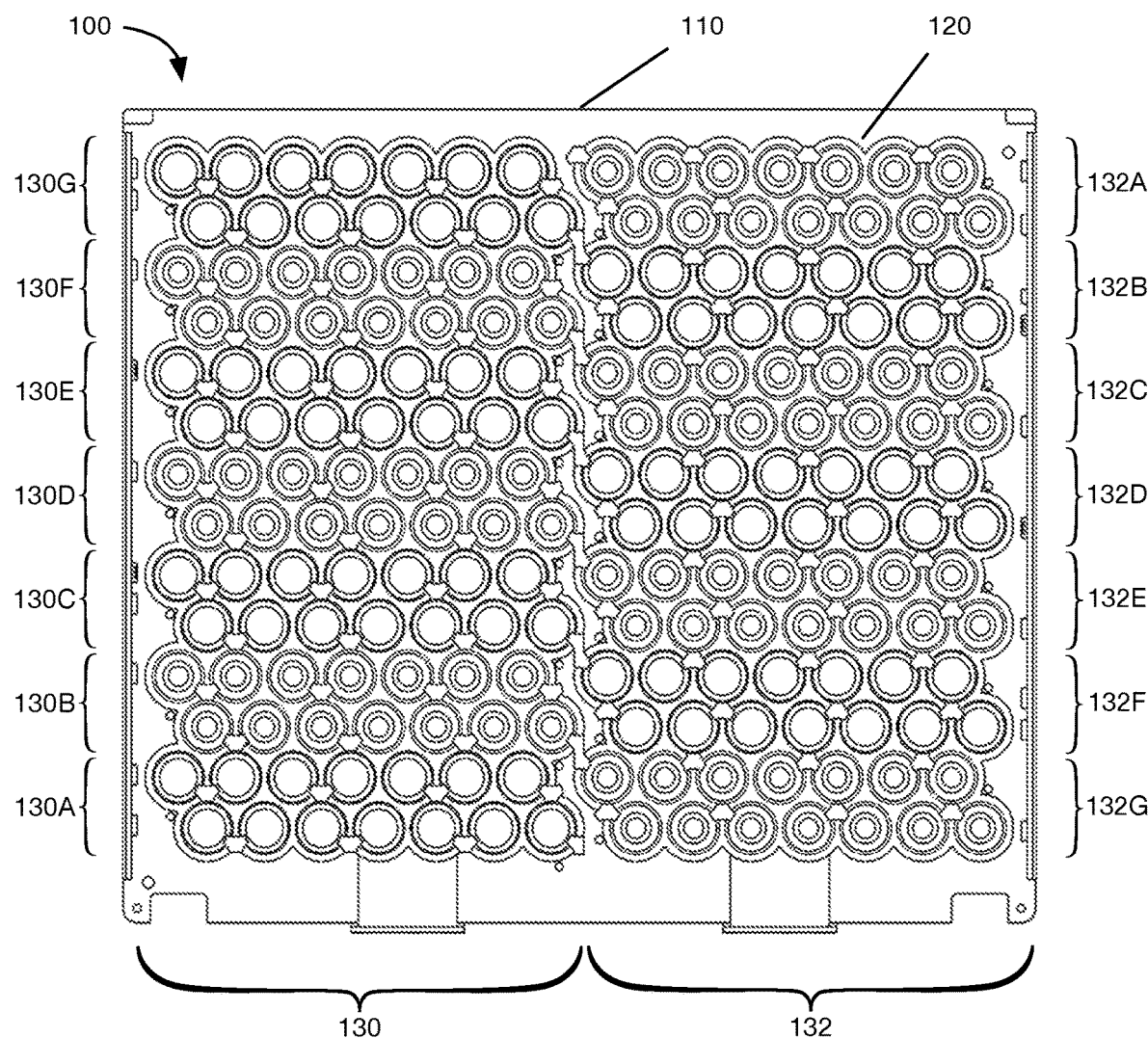
FIG. 2 is a top plan view of a battery module, with collector plates removed.

FIG. 2 illustrates an exemplary battery module structure that may be utilized to implement high-power, easy-to-manufacture, space-efficient battery packs. In particular, battery module 100 includes battery retention frame 110. Battery retention frame 110 serves to, amongst other things, physically orient and retain a number of battery cells 120 relative to the battery module as a whole. Typically, battery cells 120 are cylindrical in shape, and oriented with their longitudinal axes parallel to one another and the cell ends occupying common planes. FIG. 2 is a top plan view in which cells 120 are exposed through removal of various collectors and other structures, with cylindrical battery cells 120 oriented vertically and parallel to one another. Cells 120 may be arranged in repeating groups having alternating orientations i.e. polarity. The group size may be varied, even amongst embodiments using a common battery retention frame design, to achieve various module design specifications, such as current output and voltage level. For example, module 100 features cells 120 arranged in left grouping 130 and right grouping 132. Left subgroups 130A, 130C, 130E and 130G feature fourteen cells arranged in two rows of seven, with upward-facing cathodes. Left subgroups 130B, 130D, and 130F also feature fourteen cells arranged in two rows of seven, but are oriented with opposite polarity, i.e. with anodes facing upward towards a top side of the module. Analogously, right grouping 132 features subgroupings 132A, 132C, 132E and 132G with upward-facing anodes, while subgroups 132B, 132D and 132F are oriented with opposite polarity, i.e. upward-facing cathodes. It is contemplated and understood that in other embodiments, differing configurations (including differing cell group sizes and polarities) may be employed.

Figure 3:
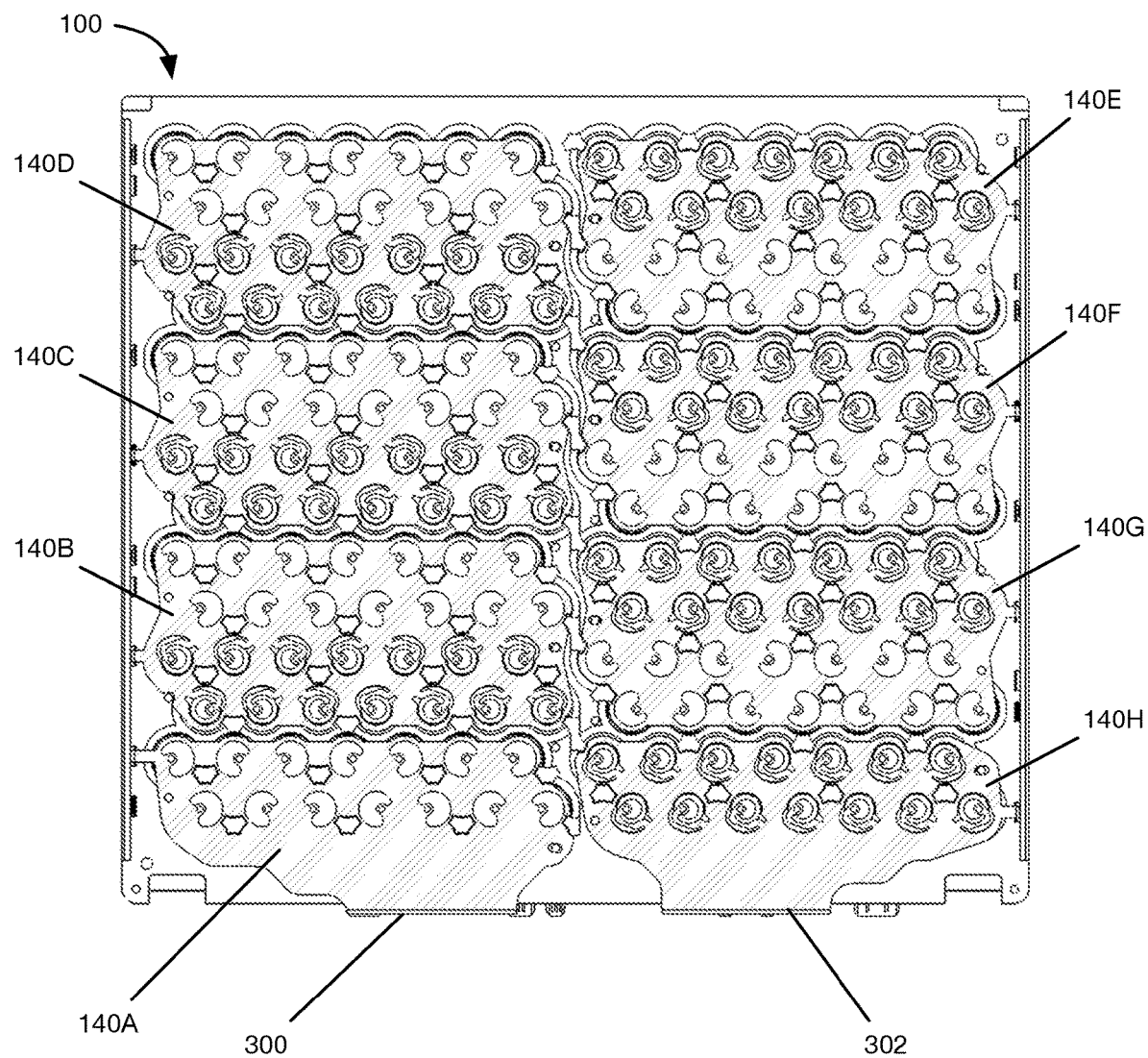
FIG. 3 is a top plan view of a battery module, with collector plates in place.

Relatively flat, conductive collector plate structures may be advantageously utilized to interconnect cells 120 in arrangements such as that of FIG. 2. FIG. 3 illustrates the battery module of FIG. 2, with collector plates applied thereto. Collector plates may be utilized to interconnect the anodes of one battery subgroup, with the cathodes of a neighboring battery subgroup. For example, in FIG. 3, collector plate 140A interconnects the cathodes of battery subgroup 130A, while also forming a battery module output terminal 300. The anodes of battery subgroup 130A are electrically connected with the cathodes of battery subgroup 130B via a collector plate on the bottom side of module 100 (not shown). The anodes of battery subgroup 130B are electrically connected with the cathodes of battery subgroup 130C by collector plate 140B. Similarly, each of collector plates 140C, 140D, 140E, 140F and 140G serve to electrically connect the anodes of one battery cell subgroup with the cathodes of a neighboring battery cell subgroup. In addition to interconnecting like terminals of a battery cell subgroup, collector plates 140A and 140H connect with module-level negative and positive output terminals 300 and 302, respectively.

Figure 4:
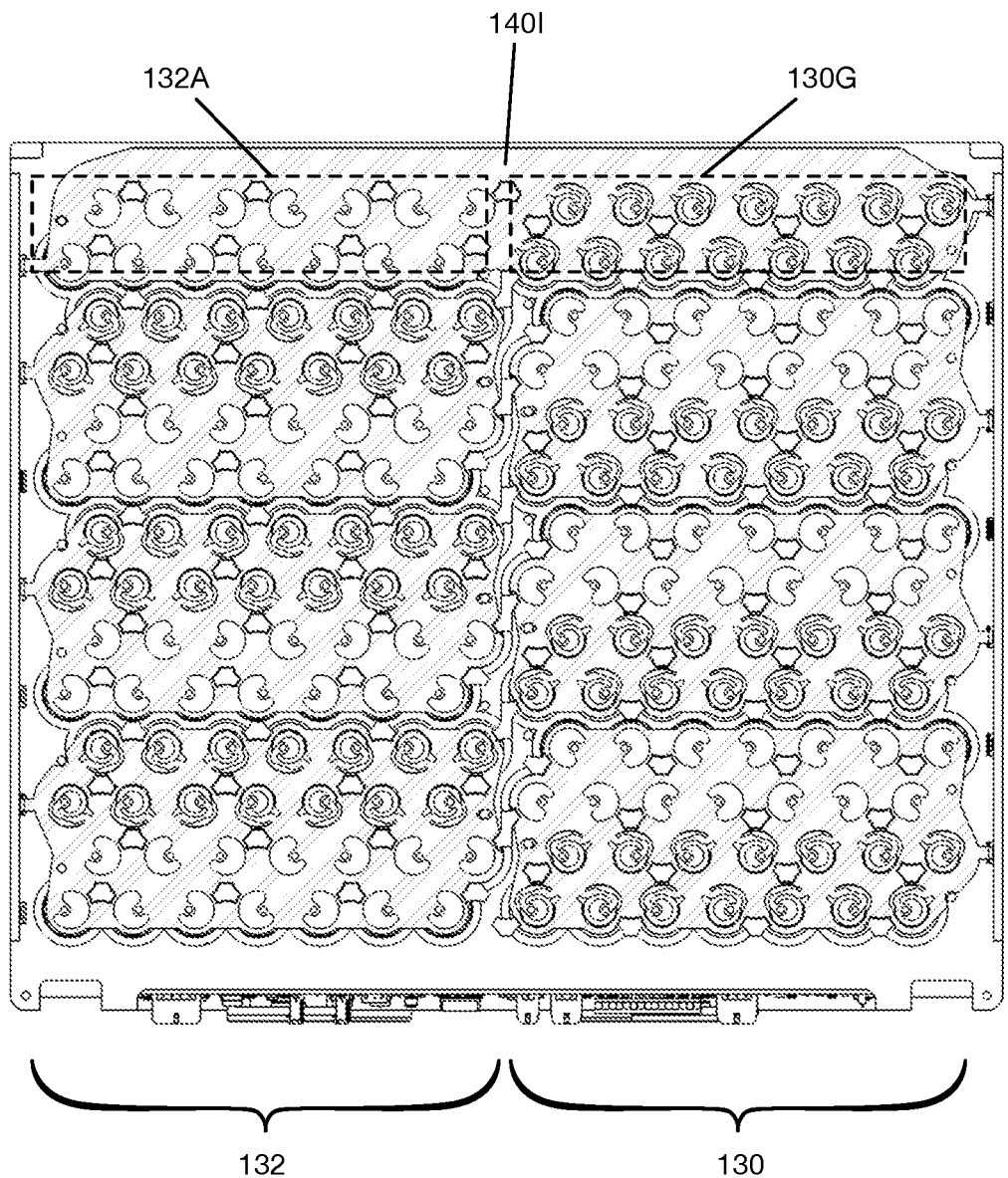
FIG. 4 is a bottom plan view of a battery module, with collector plates in place.
Figure 5:
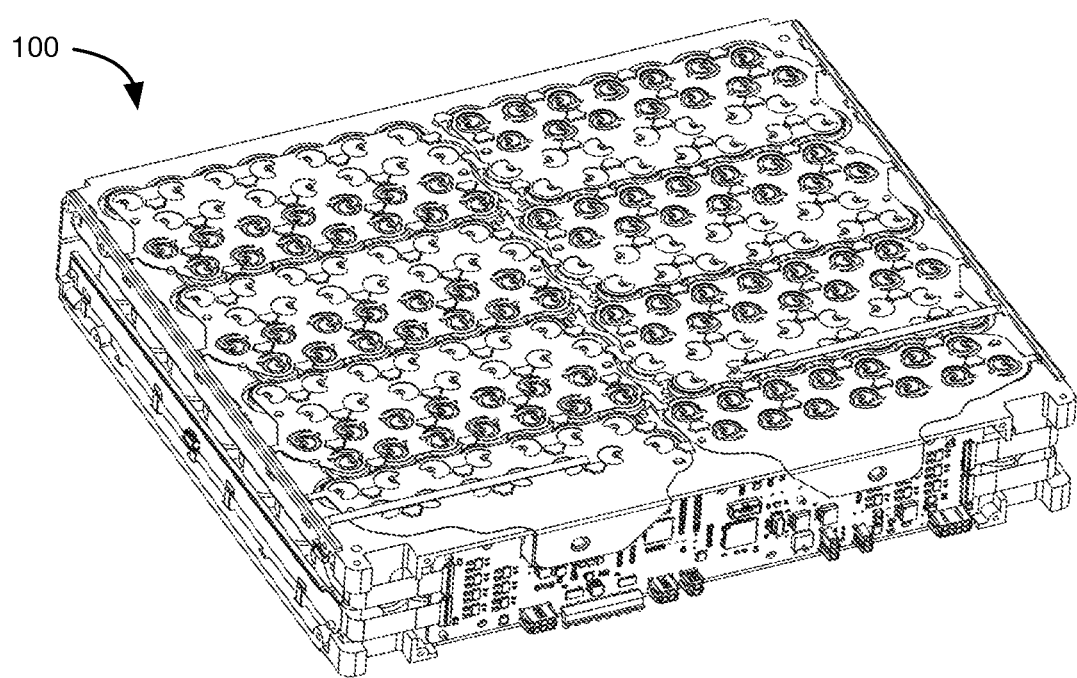
FIG. 5 is a top perspective view of a battery module, with collector plates.

The bottom side of module 100 is illustrated the bottom plan view of FIG. 4. The bottom side is generally analogous to the top side, with each cell's opposite polarity terminal exposed thereon and connected with a collector plate. However, the bottom side further includes a bridge collector plate 1401, spanning left-side cell group 130 (specifically, subgroup 130G) and right-side cell group 132 (specifically, subgroup 132A). The bridge collector plate 1401 provides, amongst other things, module-level safety features, as described further below. FIG. 5 provides a perspective view of module 100.

The battery module arrangement of FIGS. 2-5 provides a high degree of design flexibility. Collector plates 140 may be arranged in various combinations to achieve desired levels of voltage and current capacity for each module size, as described in Applicant's U.S. Patent Application No. 62/675,495, filed on May 23, 2018, the contents of which are hereby incorporated by reference. In addition to high levels of design configurability, use of collector plate construction may provide a highly compact battery module form factor. The plates are relatively thin, thereby adding very little thickness. Thus, the overall height of module 100 may be little more than the height of each cell 120.

Collector Plate Material Selection and Manufacturability

While collector plate constructions such as that of FIGS. 3-4 may present numerous advantages, one challenge in a collector plate battery module construction is material selection, balancing module performance and manufacturability. In a high-power battery module application, preferably the collector plate will be constructed from an ultra-low resistance material having a relatively low cost. However, the collector plates must also form a reliable electrical interconnect with each cell, and preferably also avoid adding excess weight to the module.

One approach to interconnecting battery cells with the collector plate is resistance welding. Resistance welding involves localized placement of ultra-low resistance electrodes to apply high levels of electric current through a junction to be welded. The applied energy operates to fuse the target components. One advantage of resistance welding for connecting battery cells with a collector plate is that the process is closed loop. Because the welding current flows directly through the components being welded, the amount of energy applied to the weld can be measured directly, so long as the path of welding current is controlled. In the event of a mis-weld, the welding apparatus can observe unexpected variation in weld energy towards identifying defects immediately during manufacture. Thus, resistance welding can offer an economical, highly reliable technique for battery module collector connections.

However, traditional techniques for resistance welding require careful control over the path through which current is applied. Uncontrolled welding currents can yield misplaced bonding, and/or distribution of energy in a manner that does not yield a desired quality of attachment. Control of welding current is typically managed by using welding electrodes having a lower resistance than the items being welded. The relative resistivity of materials being welded may also be important. With common welding equipment using copper electrodes, bonding a collector to the steel electrodes used in common battery cells, a higher resistance material may be required for the collector plate to facilitate effective bonding of the collector plate with battery electrodes. One such choice of collector plate material is nickel.

Figure 6:
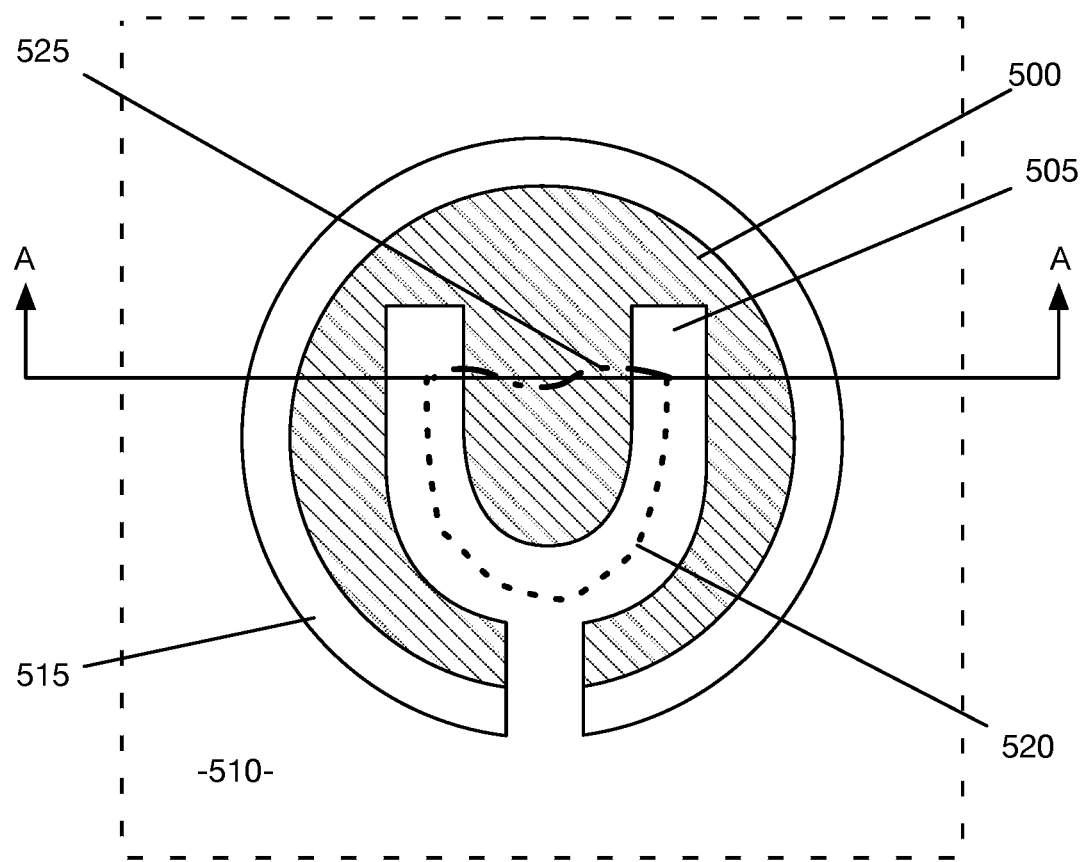
FIG. 6 is a partial cutaway top plan view of a collector arm over a battery cell.
Figure 7:
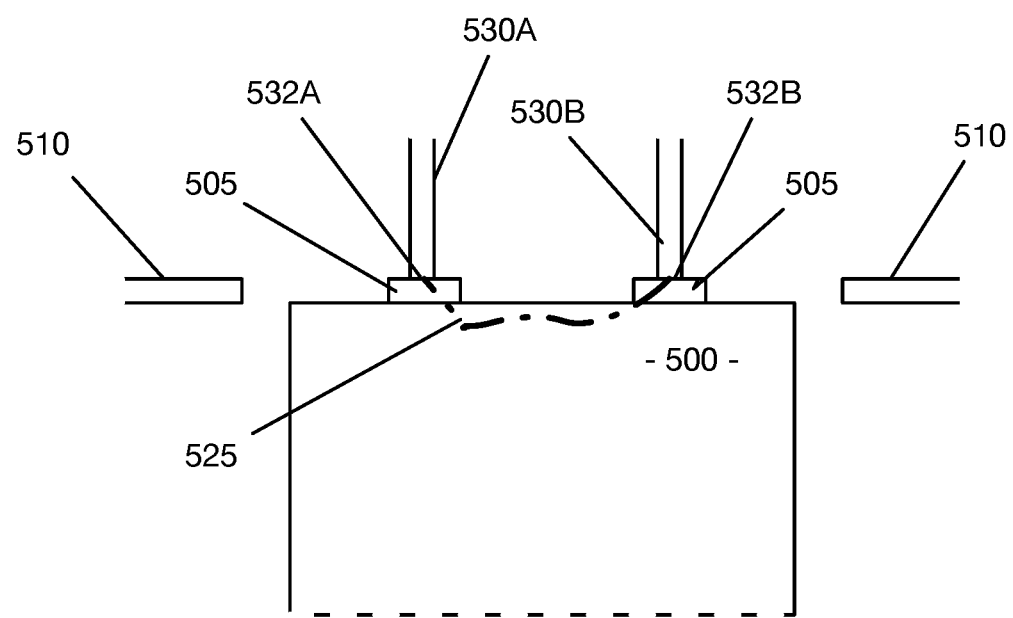
FIG. 7 is cross-section A-A of the collector arm and battery cell of FIG. 6.

FIGS. 6 and 7 illustrate an exemplary physical arrangement for welding a collector plate to a battery cell. FIG. 6 is a partial cutaway top plan view of a collector plate 510 overlying a battery cell electrode 500. Collector plate 510 features a cell aperture 515 under which cell 500 is positioned. A Y-shaped collector fork 505 extends from collector plate 510, over cell electrode 500, and is electrically connected to cell electrode 500. FIG. 7 provides a cross sectional slice view along cross-section A-A in FIG. 6.

During a welding operation, welding electrodes 530A and 530B are placed in contact with opposite prongs of collector fork 505, e.g. at positions 532A and 532B, respectively. Current typically passes between the electrodes, through the collector plate and cell, along a path of least resistance. Common cells include anodes and cathodes formed from steel. In some circumstances, collector plate 510 and Y fork 505 are formed from a material such as nickel. In such arrangements, a well-defined path of least resistance for the welding current may extend generally along path 525; i.e., current flows from welding electrode 530A, into Y fork 505 at location 532A, directly across the steel cell electrode 500, into Y fork 505 at location 532B, and into welding electrode 530B. As the welding current passes between Y-fork 505 and cell electrode 500, the two components are fused together.

While a nickel collector plate may be satisfactory in some applications, in other applications it presents disadvantages. In particular, electric vehicle applications often seek to optimize for low cost, small battery module size and weight, high power output capabilities and high efficiency. Due to the large number of cells, preferably capable of high discharge rates, the battery module may generate a very high amount of current at peak draw. In a high current environment, nickel's resistivity may limit a battery module's peak output and efficiency. Compensating for nickel's resistivity may require greater collector material volume, therefore increasing battery module size and weight.

Therefore, it may be desirable to utilize a battery module collector structure formed from a material having very low resistivity, given other design constraints. While the ultra-low resistivity of copper may be desirable for a collector structure material, traditional resistance welding techniques perform poorly when applied to copper collector structures. Current applied to a copper component by a copper electrode may be poorly controlled, resulting in greater incidence of failed welds. For example, in an embodiment of FIGS. 6 and 7 having a copper collector plate, welding current may pass between the welding electrodes by traveling around the length of Y-fork 505 (e.g. along path 520), rather than taking a physically-shorter path through the comparatively highly resistive steel cell electrode 500. Welding current that passes directly through the collector structure, rather than passing between the collector and cell electrode, fails to create the desired weld. Depending on collector plate geometry, in other circumstances, some welding current may pass into cell electrode 500 but at an undesirable or inconsistent location, rather than passing directly through Y-fork 505. For such reasons, use of resistance welding to fuse a copper collector plate with a steel cell electrode may provide unreliable results.

While alternative welding techniques may be used, they have their own drawbacks. For example, laser welding may be effectively applied to copper structures, but laser welding equipment is comparatively expensive and provides an open loop process. Failed welds are not as easily or reliably identified during manufacture, thereby requiring post-manufacturing quality control measures to evaluate the resulting battery modules that may be costlier and/or less reliable.

Use of Current Concentrators

For these reasons and others, it may be desirable to reliably implement resistance welding techniques to bond common steel-electrode battery cells to an ultra-low resistance copper collector plate in a battery module. One solution to doing so is through use of physical collector plate structures that may act to concentrate current distribution through desired portions of a collector plate.

Figure 8:
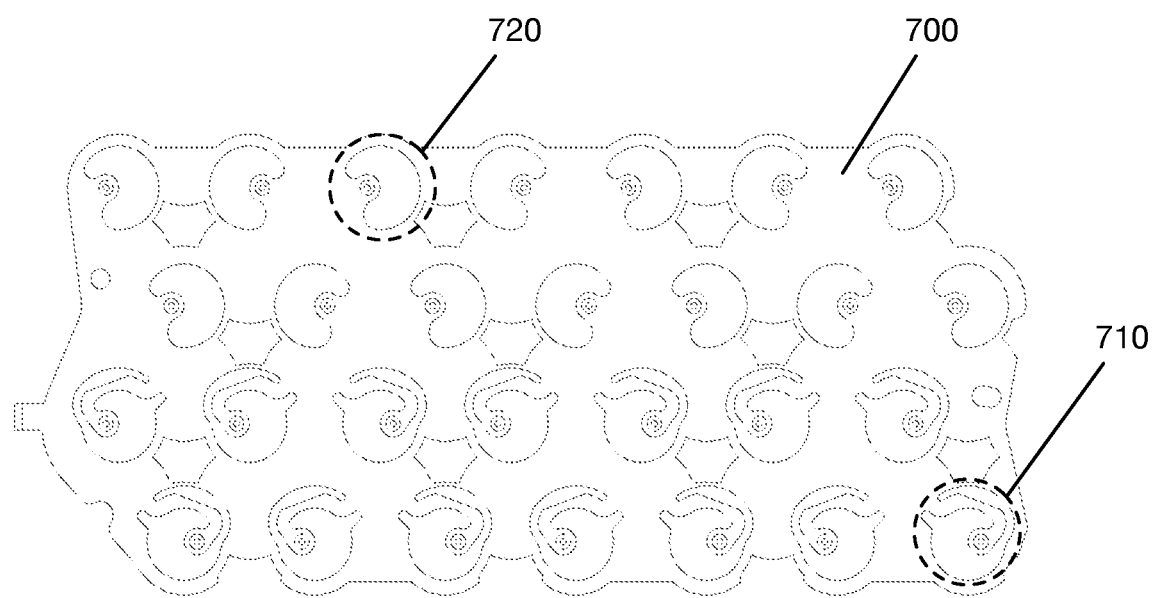
FIG. 8 is a top plan view of a collector plate.

FIG. 8 is a top plan view of a collector plate 700 having current concentrator structures integrated therein. Collector plate 700 is formed primarily from copper to achieve low resistance, preferably with a coating for corrosion resistance such as tin-plating. In the illustrated embodiment, collector plate 700 utilizes two different collector structures, for reasons described further herein below. A first collector structure 710 is used proximate cell anodes, and second collector structure 720 is used proximate cell cathodes. Anode collector structure 710 is illustrated in partial cutaway view in FIG. 9; analogous current concentrator structures may also be used in the cathode structure 720.

Figure 9:
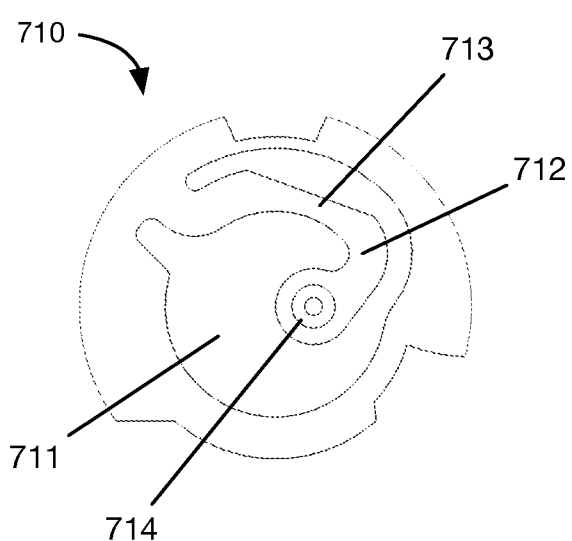
FIG. 9 is a partial cutaway view of a first collector arm structure with cell-level fusible link and current concentrator.

Collector structure 710 combines a current concentrator structure to promote effective resistance welding, with an integrated per-cell fusible link. Collector structure 710 includes a central aperture 711 under which a cell is positioned, with the cell length extending perpendicularly from the collector plate. Collector arm 712 extends around the periphery of aperture 711 to a central attachment point, which contacts with a battery cell electrode underlying the collector plate. Collector arm 712 acts as a fusible link. The arm length and cross-sectional area of collector arm 712 may be specified to provide a desired maximum energy carrying capacity. In the embodiment of FIG. 9, collector arm 712 wraps around a periphery of aperture 711 in order to form a desired conductive path length before energy is dissipated into the bulk material of collector plate 700. Moreover, collector arm 712 includes a fuse portion 713 that is narrowed relative to the remainder of conductor arm 712 to define a locally minimized current carrying capacity, thereby provided a controlled location for fusing of the conductive path in the event that an underlying battery cell discharges at too high of a rate, such as a cell short. As mentioned above, in order to facilitate reliable and localized resistance welding of collector arm 712, even when formed from copper, a current concentrator structure 714 is formed in the collector arm.

Figure 10:
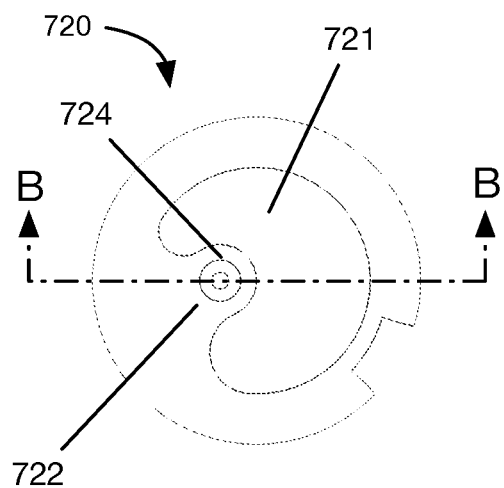
FIG. 10 is a partial cutaway view of another collector arm structure with current concentrator.

Similarly, FIG. 10 is a partial cutaway view of another collector structure embodiment, utilized for cell cathodes in the collector plate of FIG. 8. Collector structure 720 includes a broader collector arm 722 extending into aperture 721, and having current concentrator 724. Thus, anode conductor arm 713 provides per-cell fuse protection integrated directly into the collector plate structures, while cathode structure 720 provides greater amounts of copper material connecting conductor plate 700 with underlying cells, thereby improving, e.g., heat dissipation from the cells.

Figure 11:
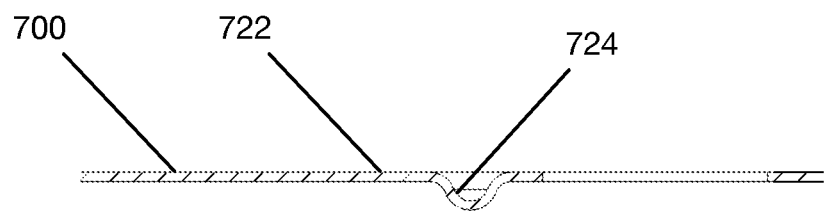
FIG. 11 is a cross-sectional view B-B of the collector arm structure of FIG. 10.

FIG. 11 is a cross-sectional view of the collector structure 720 with current concentrator structure 724, along section line B-B. As illustrated, current concentrator 724 is formed from a rounded dimple, extending downwards from a flat plane in which the bulk of collector plate 700 primarily lies, towards an electrode surface of an underlying battery cell. In some embodiments, the dimple may have an inner radius of approximately 0.75 mm, extending (with material thickness)

to a point approximately 0.8 mm below a plane formed by collector plate 700. Current concentrator 714 may be constructed similarly.

Figure 12:
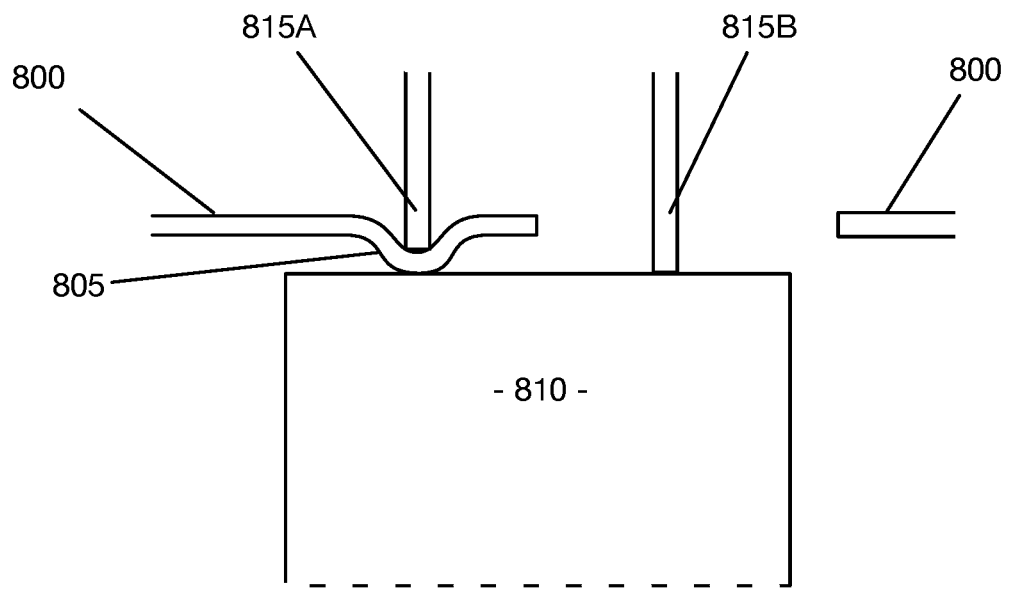
FIG. 12 is a cross-section of a collector arm with current concentrator, as utilized in a resistance welding operation.

A technique for resistance welding a copper collector plate having current concentrators, to a standard steel battery cell, is illustrated in FIG. 12. FIG. 12 is a schematic illustration of a resistance welding operation, fusing a collector plate 800 having current concentrator structure 805, to battery cell electrode 810. A first welding electrode 815A contacts a top surface of collector plate 800 proximate current concentrator 805. A second welding electrode 815B contacts battery cell electrode 810 directly. The welding current passes from first welding electrode 815A, through current concentrator 805 into cell electrode 810, then out through second welding electrode 815B.

This arrangement provides numerous advantages that operate in concert to facilitate consistent and reliable welding of the collector plate to the cell, even given the low resistivity of a copper collector plate and the resistance imbalance between the collector plate and battery electrode. For example, placing one welding electrode 815A on the collector plate and the other welding electrode 8158 directly on battery electrode 810 (i.e. asymmetric welding electrode placement) forces the welding current to pass between collector plate 800 and battery electrode 810, despite the low resistivity of collector plate 800 relative to battery electrode 810. Meanwhile, current concentrator structure 805 promotes consistency in the location at which current passes between collector plate 800 and battery electrode 810, concentrating that current into a defined location for a reliable and precisely-located weld, and preventing stray currents from running through the very low resistivity copper collector plate.

For collector plate regions forming integrated fusible links, conductor arm shapes such as that of FIG. 9 may be particularly beneficial to the above-described asymmetric welding process. In particular, wrapping collector arm 713 generally around the circumference or periphery of aperture 711, as shown, may provide multiple simultaneous benefits. One such benefit is providing sufficient collector arm length to form a structure that is reliably fusible, and doesn't merely act to pump heat into the cell and collector plate. The fusible link structure of FIG. 9 also provides a placement of current concentrator 714 (and therefore the collector plate welding point) within a relatively central portion of an underlying battery electrode. Finally, the illustrated fusible link structure tends to maximize the open space provided by aperture 711 over each cell, while minimizing the total amount of copper removed from the collector plate. Minimizing total copper removal promotes maximum total conductivity for the collector plate. Meanwhile, a generous size of aperture 711 provides generous clearance for a welding electrode to pass through aperture 711 and contact an underlying battery cell electrode during manufacture. A large aperture 711 also helps optimize the performance of heat sinks that may be applied on an end of each cell. For example, thermal paste may be applied directly to a cell through aperture 711, enabling an overlying heat sink to conduct heat directly from the cell.

While the above-described combination of features is believed to be particularly beneficial, it is contemplated and understood that individual features described herein (such as asymmetric electrode placement, current concentrators, per-cell fusible link structures and collector plate aperture structures) may each be beneficially used on their own, or in various other combinations.

Figure 13:
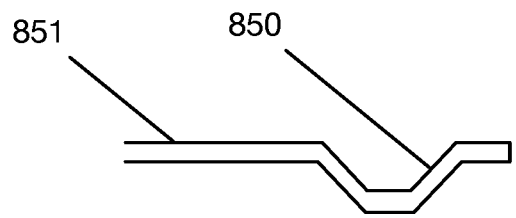
FIG. 13 is a cross-sectional view of another current concentrator embodiment.

While the embodiments of FIGS. 8-12 illustrate current concentrator structures formed as rounded inward depressions or dimples in an otherwise flat collector plate, it is contemplated and understood that other geometries and constructions may also be beneficially utilized as a current concentrator. For example, FIG. 13 illustrates (in side cross-sectional view) an angular current concentrator 850 extending inward, towards the battery cell ends proximate thereto, from a plane in which the bulk of the associated collector plate 851 lies. These and other collector plate geometries may be effectively utilized to control a location at which current applied to a low-resistance collector plate conductor arm passes into a battery cell electrode.

Figure 14:
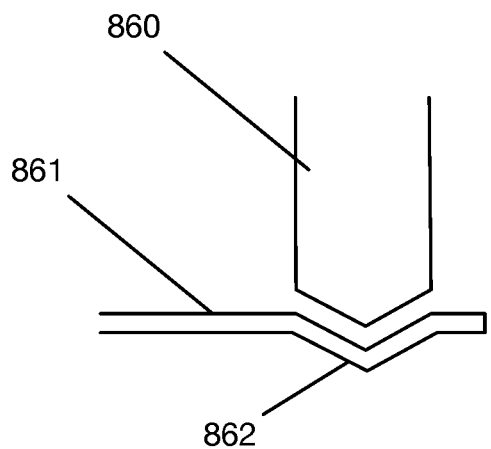
FIG. 14 is a cross-sectional view of a current concentrator embodiment in which a current concentrator can be formed during the welding operation.

Some current concentrator structures, such as those illustrated in FIGS. 12 and 13, may be formed during collector plate manufacture, prior to application of the collector plate to a battery module. However, other collector plate current concentrators may be formed during the welding or module assembly process, thereby enabling inexpensive manufacture of collector plates from flat copper sheeting with minimized machining requirements. For example, FIG. 14 illustrates (in a schematic diagram cross-section at a point of contact between the welding electrode and collector plate) an embodiment in which current concentrator structures are formed in a collector plate integrally with the weld operation. A welding electrode 860 includes a pointed tip (shown, in the embodiment of FIG. 14, being chisel-point or conical in cross-section, although other geometries could be utilized). A pointed tip of welding electrode 860 is applied to a top surface of collector plate 861 with sufficient force to deform collector plate 861 downwards at the point of contact with welding electrode 860, forming current concentrator 862. Such a welding process and mechanism may be utilized to form current concentrator structures during the welding operation, even with flat, inexpensively-manufactured collector plates.

The fusible links to each cell that may be provided in certain above-described embodiments of collector plate structures may enhance battery pack safety, and minimize the impact of cell failure on the battery pack as a whole. Also, high-power battery packs are also commonly implemented with pack-level fuses, to stop current flow in the event that a battery pack as a whole fails or otherwise exceeds maximum thermal or energy specifications. However, to the extent that a battery pack may be formed from multiple independently-functioning battery modules, it may be desirable to implement module-level fusing. For example, in a battery pack featuring three modules connected in parallel, if one module were to enter thermal runaway or initiate an uncontrolled discharge, activating a fuse to disconnect the failed module may preserve the remaining modules, e.g. by preventing the failing module from having deleterious thermal effects on surrounding components. While the overall battery pack capacity may be reduced (e.g. reduced by a third in an example where one of three modules fails), the pack as a whole may continue to function, potentially enabling its host machine to continue operation.

One technique for fusing a battery module may involve attaching a fuse structure to a module output terminal. However, output terminals are typically exposed to mechanical stress and require connectors, potentially introducing added points of failure.

Figure 15:
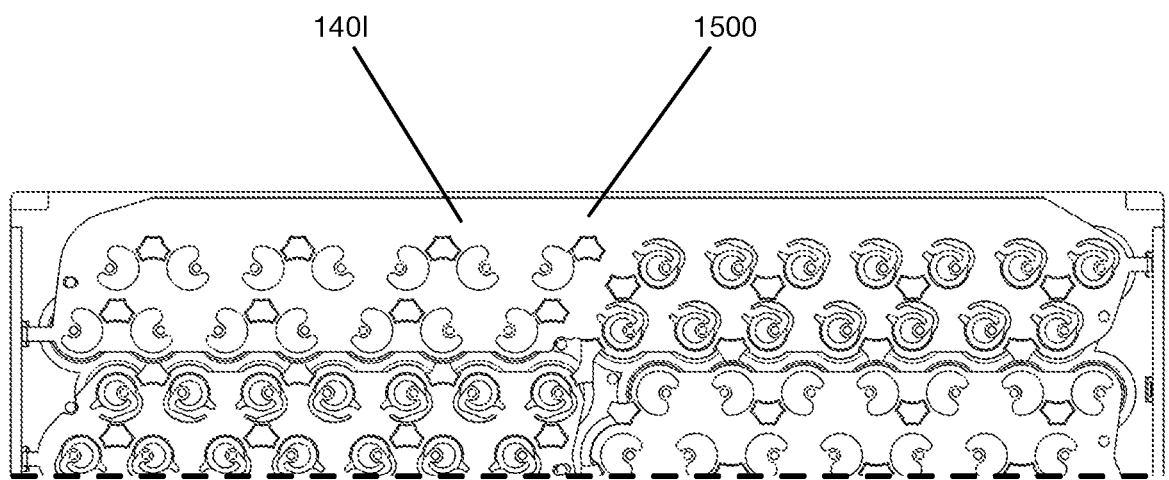
FIG. 15 is a top plan view of a bridge collector plate having a module-level fusible link.

Therefore, it may be desirable to integrate module-level fusing directly into the battery module. Integrated module-level fusing may be effectively implemented via design of a bridge collector plate. In the two-sided module configuration explained above in connection with, e.g., FIGS. 2-5, a module-level fusible link may be particularly effective when formed in a bridge collector plate spanning two sides of the module. Such a bridge collector plate 1401 is shown in the embodiment of FIG. 4. Bridge collector plate 1401 is shown in an enlarged partial cutaway view in FIG. 15. Bridge collector plate 1401 includes a narrowed fusible link portion 1500. Because module-level fusible link portion 1500 is formed in a portion of bridge collector plate 1401 that spans the left and right sides of the module, the entire module's current flows through it. Fusible link portion 1500 is sized to have a desired maximum current carrying capacity, determined by, e.g., the collector plate material specifications, and the geometry of portion 1500. Preferably, in an embodiment in which the cells, the modules and the pack as a whole are separately fused, module-level fusible link 1500 will be sized to have a current carrying capacity that is less than the aggregate capacity of all of the module cell fusible links, but more than a pro rata allocation of the pack's fuse capacity.

By forming a module level fusible link integrally with the collector plates, safety and reliability may be improved without adding parts, weight, manufacturing complexity or mechanical points of failure.

While certain embodiments of the invention have been described herein in detail for purposes of clarity and understanding, the foregoing description and Figures merely explain and illustrate the present invention and the present invention is not limited thereto. It will be appreciated that those skilled in the art, having the present disclosure before them, will be able to make modifications and variations to that disclosed herein without departing from the scope of any appended claims.

What is claimed is:

1. A battery module comprising:
  a plurality of battery cells, each of said battery cells comprising an electrode at each of a top and bottom end, the battery cells oriented with longitudinal axes parallel to one another and ends aligned;
  a plurality of top collector plates formed primarily from copper, each top collector plate overlying said top ends of a subset of said battery cells and electrically connected to each of said battery cells within said subset via top collector arms;
  a plurality of bottom collector plates formed primarily from copper, each bottom collector plate overlying said bottom ends of said battery cells and electrically connected to each of said battery cells within said subset via bottom collector arms;
  wherein each of said top collector plates and bottom collector plates further comprises apertures, each aperture overlying a battery cell, in which at least some of the associated top collector arms and bottom collector arms wrap around at least a portion of a periphery of an aperture into which each such collector arm extends;
  the battery module further comprising a battery retention frame into which said plurality of battery cells are installed, wherein said plurality of top collector plates are mounted to a top side of the battery retention frame, and said plurality of bottom collector plates are mounted to a bottom side of the battery retention frame; and
  current concentrators formed in a plurality of said top collector arms and bottom collector arms, each at locations where current applied to said collector arms passes into an electrode of one of said battery cells;
  in which said current concentrators each comprise a localized inward depression towards an end of one of said battery cells, relative to a plane in which an associated collector arm primarily lies, such that the current concentrators have a shape of a rounded dimple or a dimple being chisel-shape or conical in cross-section.

2. The battery module of claim 1, in which at least some of said current concentrators are formed by deformation of a collector plate in which the current concentrator is formed, said deformation being accomplished during a welding operation fusing said collector plate with underlying battery cells.

* * * * *